(12) United States Patent
Thiele et al.

(10) Patent No.: US 9,940,962 B2
(45) Date of Patent: Apr. 10, 2018

(54) LOW POWER THERMALLY ASSISTED DATA RECORDING MEDIA

(71) Applicant: Seagate Technology LLC, Cupertino, CA (US)

(72) Inventors: Jan-Ulrich Thiele, Sunnyvale, CA (US); Yinfeng Ding, Fremont, CA (US); YingGuo Peng, San Ramon, CA (US); Kai-Chieh Chang, Pleasanton, CA (US); Timothy John Klemmer, Union City, CA (US); Li Gao, San Jose, CA (US); Yukiko Kubota, Campbell, CA (US); Ganping Ju, Pleasanton, CA (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 14/839,441

(22) Filed: Aug. 28, 2015

(65) Prior Publication Data
US 2016/0064022 A1 Mar. 3, 2016

Related U.S. Application Data

(60) Provisional application No. 62/043,791, filed on Aug. 29, 2014.

(51) Int. Cl.
*G11B 5/65* (2006.01)
*G11B 5/66* (2006.01)
(Continued)

(52) U.S. Cl.
CPC ............ *G11B 5/653* (2013.01); *C22C 5/04* (2013.01); *G11B 5/66* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 2003/0108721 A1* | 6/2003 | Fullerton | ............... | G11B 5/66 428/195.1 |
| 2007/0212573 A1* | 9/2007 | Kuo | ............... | C23C 14/025 428/817 |

(Continued)

FOREIGN PATENT DOCUMENTS

| | | |
|---|---|---|
| JP | 2003313659 A * 11/2003 | |
| WO | WO 201318721 A1 * 12/2013 | ............ G11B 5/653 |

OTHER PUBLICATIONS

T. Hasegawa, J. Miyahara, T. Narisawa, S. Ishio, H. Yamane, Y. Kondo, J. Ariake, S. Mitani, Y. Sakuraba and K. Takanashi, "Study of ferro-antiferromagnetic transition in [001]-oriented L 1 0 FePt 1-x Rh x film," Journal of Applied Physics, 2009, pp. 1-6, American Institute of Physics.

(Continued)

*Primary Examiner* — Holly Rickman
*Assistant Examiner* — Lisa Chau
(74) *Attorney, Agent, or Firm* — Hall Estill Attorneys at Law

(57) ABSTRACT

In some embodiments, a thermally assisted data recording medium has a recording layer formed of iron (Fe), platinum (Pt) and a transition metal T selected from a group consisting of Rhodium (Rh), Ruthenium (Ru), Osmium (Os) and Iridium (Ir) to substitute for a portion of the Pt content as $Fe_Y Pt_{Y-X} T_X$ with Y in the range of from about 20 at % to about 80 at % and X in the range of from about 0 at % to about 20 at %.

20 Claims, 3 Drawing Sheets

(51) Int. Cl.
    *C22C 5/04*        (2006.01)
    *G11B 5/00*        (2006.01)

(56)         References Cited

U.S. PATENT DOCUMENTS

2009/0040644  A1*  2/2009  Lu ........................ G11B 5/314
                                                         360/59
2009/0161254  A1*  6/2009  Ishio .................... B82Y 10/00
                                                         360/110
2009/0226762  A1*  9/2009  Hellwig ................ G11B 5/66
                                                         428/815

OTHER PUBLICATIONS

Dongbin Xu, Cheng-Jun Sun, Jing-Sheng Chen, Tie-Jun Zhou, Steve M. Heald, Anders Bergman, Biplab Sanyal and Gan Moog Chow, "Tuning the Curie temperature of L 1 0 ordered FePt thin films through site-specific substitution of Rh," Journal of Applied Physics, 2014, pp. 1-9, AIP Publishing.

* cited by examiner

LOW POWER THERMALLY ASSISTED DATA RECORDING MEDIA

RELATED APPLICATIONS

The present application makes a claim of domestic priority to U.S. Provisional Patent Application No. 62/043,791 filed Aug. 29, 2014, the contents of which are hereby incorporated by reference.

SUMMARY

Various embodiments of the present disclosure are generally directed to low power thermally assisted data recording media.

In some embodiments, an apparatus comprises a thermally assisted data recording medium with a recording layer formed of iron (Fe), platinum (Pt) and a transition metal T selected from a group consisting of Rhodium (Rh), Ruthenium (Ru), Osmium (Os) and Iridium (Ir) to substitute for a portion of the Pt content as $Fe_Y Pt_{Y-X} T_X$ with Y in the range of from about 20 at % to about 80 at % and X in the range of from about 0 at % to about 20 at %.

In other embodiments, a data recording medium comprises a substrate, and a thermally assisted data recording layer supported by the substrate and formed of $Fe_{50} Pt_{50-X} Rh_X$, where X is from about 0 at % to about 20 at %.

In still other embodiments, a data recording medium comprises a substrate and a multi-layer recording structure supported by the substrate. The multi-layer recording structure comprises a first thermally assisted data recording layer having a first material composition and a second thermally assisted data recording layer having a different, second material composition of $Fe_Y Pt_{Y-X} T_X$ with T selected from a group consisting of Rh, Ru, Os and Ir, Y is from about 20 at % to about 80 at % and X is from about 0 at % to about 20 at %.

DETAILED DESCRIPTION

Figure 1:
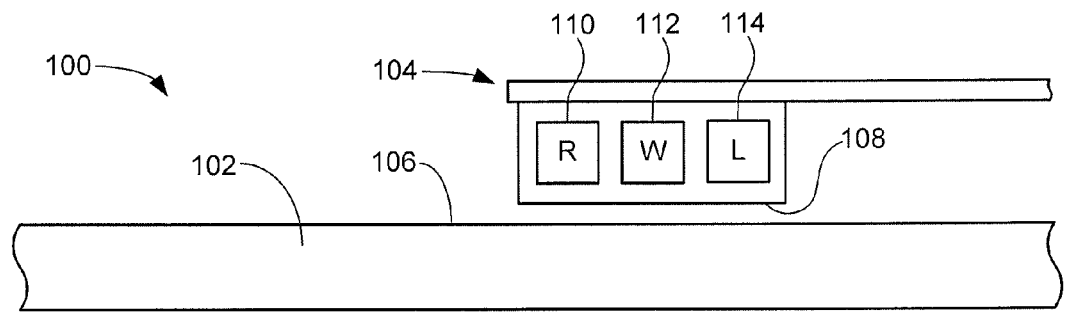
FIG. 1 shows a data recording system in accordance with some embodiments.

The present disclosure is generally directed to thermally assisted magnetic recording. In a perpendicular magnetic recording (PMR) system, a magnetic sequence is written to a recording structure of a medium such that the magnetization axes of the bits are in a direction generally perpendicular to the plane of the recording layers.

A perpendicular recording medium can take a variety of forms. Some common configurations include a substrate, a soft underlayer (SUL), one or more intermediate layers, one or more magnetic recording layers, and a protective carbon overcoat (COC). A layer of lubricant may be applied to the COC to reduce damage from contact between the medium and a read/write transducer used to record and read data back from the medium.

Thermally assisted perpendicular magnetic recording (TAPMR), such as heat assisted magnetic recording (HAMR) or microwave assisted magnetic recording (MAMR), generally involves the application of energy to a localized spot adjacent the writing field of a transducer. The applied energy raises the localized temperature of the recording structure to a point near or above the magnetic Curie temperature of the structure, thereby enabling the applied write field to write the desired magnetic sequence to the structure. A number of sources can be used to apply the requisite energy. A HAMR system, for example, may use a laser or other light source along with other elements such as a near field transducer (NFT). A MAMR system, for example, may use a high frequency oscillator.

Reliability and performance of a TAPMR recording system generally requires low laser power and high signal to noise (SNR) recording characteristics. From a media standpoint, these objectives can often be achieved by appropriate thermal design and a magnetic recording structure with large magneto-crystalline anisotropy and low magnetic Curie temperature.

In previous studies, the Curie temperature of a magnetic recording layer has been lowered by the addition of 3d-transition metals such as Chromium (Cr), Manganese (Mn), Cobalt (Co), Nickel (Ni) or Copper (Cu) to a base Iron (Fe) and Platinum (Pt) alloy (e.g., FePt L10 alloy). These materials were used to substitute for a portion of the Fe content of the layer material. While these materials were found to lower the Curie temperature Tc, and magnetization, Ms, these elements also undesirably lowered the magneto-crystalline anisotropy, Ku, at an even faster rate. Thus, these materials were not found to be particularly suitable for a TAPMR application over traditional PMR applications.

Other previous studies have examined the use of a 4-d transition metal such as Palladium (Pd) which was substituted for a portion of the Pt content in the FePt L10 alloy. These types of arrangements were found to lower the magneto-crystalline anisotropy faster than the Curie temperature, and were therefore also not particularly suitable for TAPMR applications.

Accordingly, various embodiments of the present disclosure are generally directed to a thermally assisted perpendicular magnetic recording (TAPMR) structure, such as a HAMR medium or a MAMR medium, in which a selected transition metal such as the 4-d transition metal Rhodium (Rh) substitutes for a portion of the Pt content in a FePt alloy. It has been found that these and other similar arrangements can provide a slower reduction of the magneto-crystalline anisotropy, thus allowing for high coercivity, high performance media with reduced energy source power requirements.

It was found that doping FePt with Rh lowers the Curie temperature Tc, and hence the recording temperature, of FePt-based HAMR media while maintaining high magnetic stability and performance, hence improving HAMR reliability. Various substitutional doping ranges were evaluated as discussed below. While Rh is contemplated as the substitutional doping transition metal, other substitutionary materials provide similar performance improvements such as Ruthenium (Ru), Osmium (Os) and Iridium (Ir).

These and other improvements and features of various embodiments can be understood beginning with a review of FIG. 1 which provides a simplified schematic representation of a thermally assisted perpendicular magnetic recording (TAPMR) system 100. The system 100 is characterized as a heat assisted magnetic recording (HAMR) system, although such is merely exemplary and is not limiting. The system 100 includes a rotatable perpendicular magnetic data recording medium 102 and an adjacent data transducer 104.

Generally, the medium 102 and the transducer 104 may be incorporated into a hard disc drive (HDD) or other data storage device wherein multiple axially arranged recording media (discs) and data transducers are used to record and retrieve user data.

In some embodiments, the data are stored on the medium 102 along a number of concentric tracks (not shown) defined along the surface 106 of the medium. The data may be stored in the form of addressable user data sectors of fixed size along the tracks. Hydrodynamic features (such as air bearing surface 106) may be provisioned on a facing surface of the transducer 104 to enable to transducer to be fluidically supported in close proximity to the medium surface 106 by atmospheric currents established during rotation of the medium 106.

The data transducer 104 is shown to include respective read (R) and write (W) 110, 112. The read element 110 may take the form of a magneto-resistive (MR) sensor. The write element 112 may include a write coil and one or more magnetically permeable cores adapted for perpendicular magnetic recording. A laser source (L) 114 is adapted to supply energy in the form of electromagnetic radiation to a localized area of the medium 102 during data recording operations to lower the Curie temperature, Tc, of the medium and facilitate reliable data recording.

While the system of FIG. 1 is adapted for a HAMR application, such is not necessarily required. The media can take any number of suitable forms including so-called ECC+CGC (exchange coupled composite+continuous granular composite) perpendicular recording media.

Figure 2:
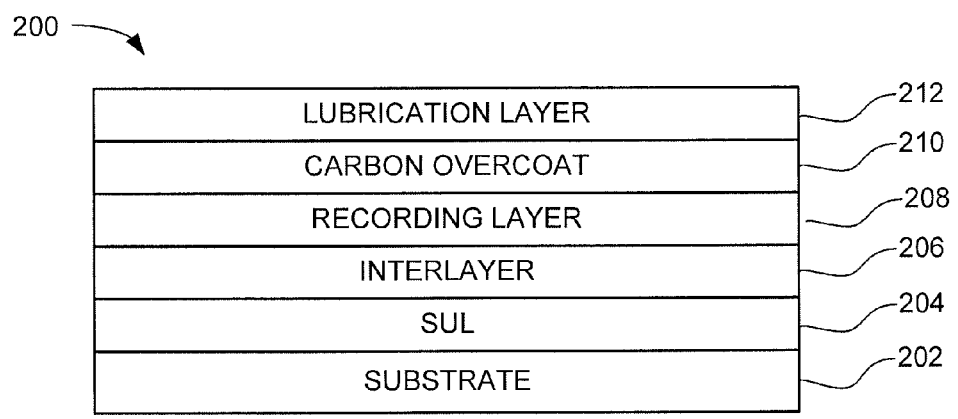
FIG. 2 shows a data storage medium in accordance with some embodiments.

FIG. 2 depicts relevant aspects of a perpendicular magnetic data recording medium 200 suitable for use in a data recording system such as depicted in FIG. 1. The medium format is merely exemplary as any number of other forms can be used. FIG. 2 shows illustrative layers including a substrate 202, a soft magnetic underlayer (SUL) 204, an interlayer 206, a magnetic recording layer (structure) 208, a carbon overcoat (COC) protective layer 210 and a lubrication layer 212. Any number of additional layers can be incorporated including, without limitation, seed layers, additional intermediate layers, domain control layers, antiferromagnetic (AFM) layers, barrier diffusion layers, additional recording layers, etc.

Figure 3:
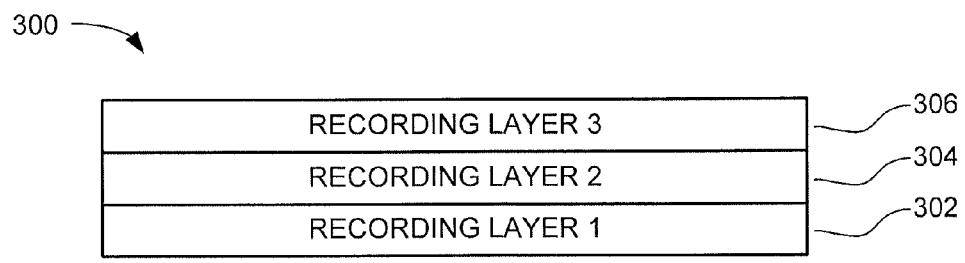
FIG. 3 shows a format for a multi-layer recording layer in accordance with some

FIG. 3 depicts relevant aspects of another perpendicular magnetic data recording medium 300 suitable for use in a data recording system such as depicted in FIG. 2. FIG. 3 shows a multi-layer recording structure that can be used, for example, as the recording layer 208 in FIG. 2. The structure includes three successive recording layers 302, 304, 306 denoted as recording layers 1-3. Other numbers and arrangements of layers can be used. The various layers can include interlayers, seed layers, barrier layers, nonmagnetic layers, etc. as required.

In accordance with various embodiments, the respective recording layers shown in FIGS. 2-3 are formed of an FePt alloy doped with a selected transition metal, such as but not necessarily limited to Rh, Ru, Os or Ir, or combinations thereof. In some embodiments, an $Fe_{50}Pt_{50-x}Rh_x$ alloy is used. In some cases, X (at %) may be from about 0 to about 20. In other cases, X may be from about 0 to about 5. In other cases, X may be from about 1 to about 20 or about 1 to about 5. Other ranges can be used as well, and other formulations are also envisioned and will occur to the skilled artisan in view of the present disclosure. Any number of suitable deposition methodologies can be used to form the recording structure including but not limited to physical vapor deposition (PVD), chemical vapor deposition (CVD), plasma based deposition, sputtering, etc.

Figure 4:
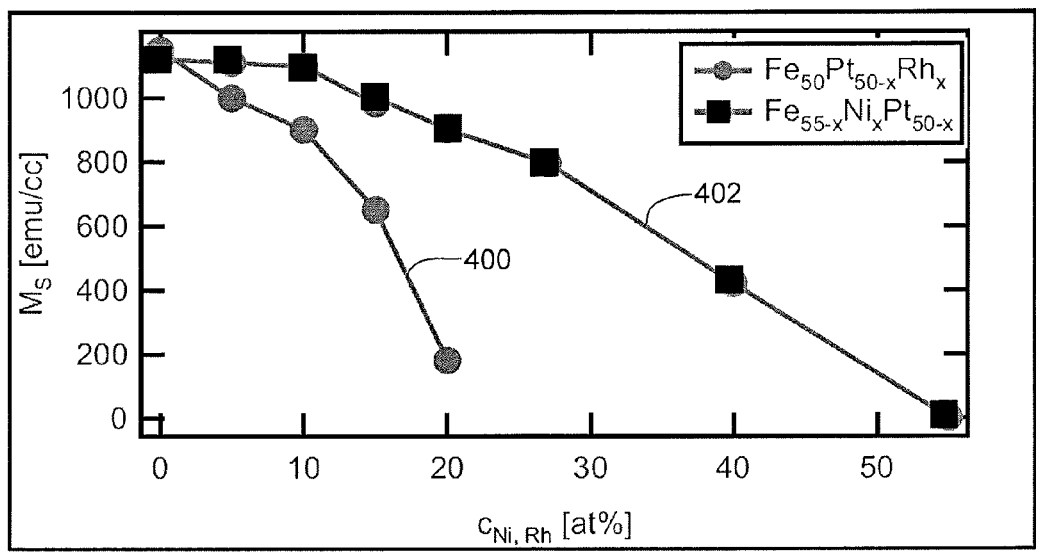
FIG. 4 graphically illustrates magnetic saturation (Ms) characteristics of some embodiments.

FIGS. 4-7 show graphical representations of data obtained from various media formulated in accordance with the present disclosure. FIG. 4 provides two performance curves 300, 302 plotted against a percentage (at %) x-axis and a magnetic saturation, Ms (in $emu/cm^3$) y-axis. Curve 400 is for FePtRh media formulated as $Fe_{50}Pt_{50-x}Rh_x$ with X from about 0 at % to about 20 at %. Curve 402 is for FeNiPt media formulated as $Fe_{55-x}Ni_xPt_{50-x}$, with X from about 0 at % to about 55 at %.

Figure 5:
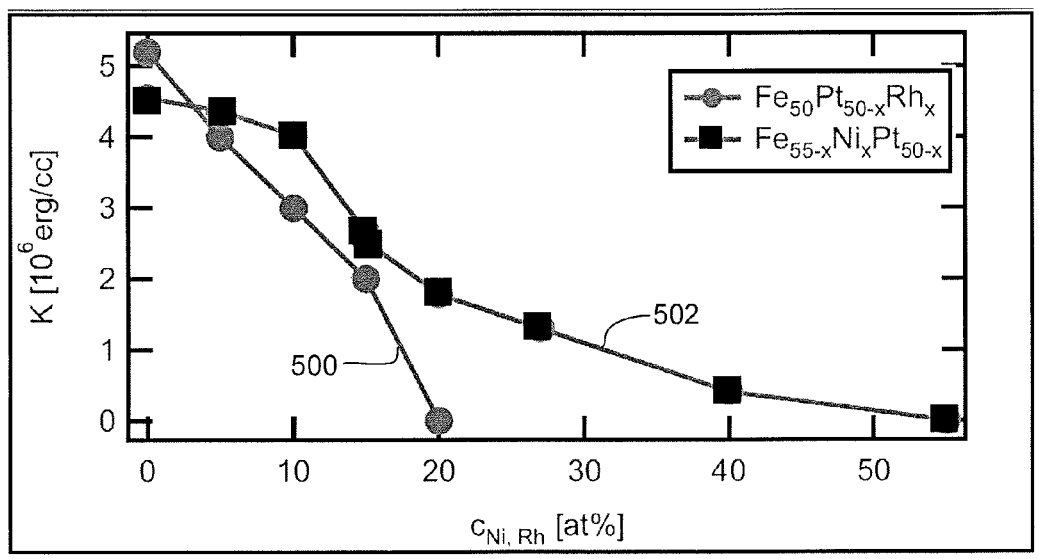
FIG. 5 graphically illustrates magnetic anisotropy (K) characteristics of some embodiments.
Figure 6:
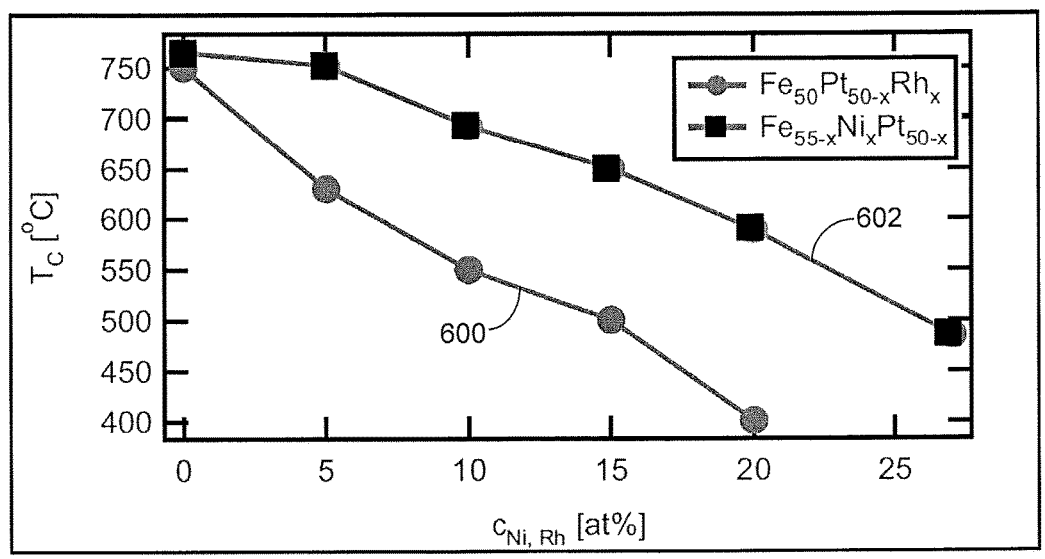
FIG. 6 graphically illustrates Curie temperature (Tc) characteristics of some embodiments.
Figure 7:
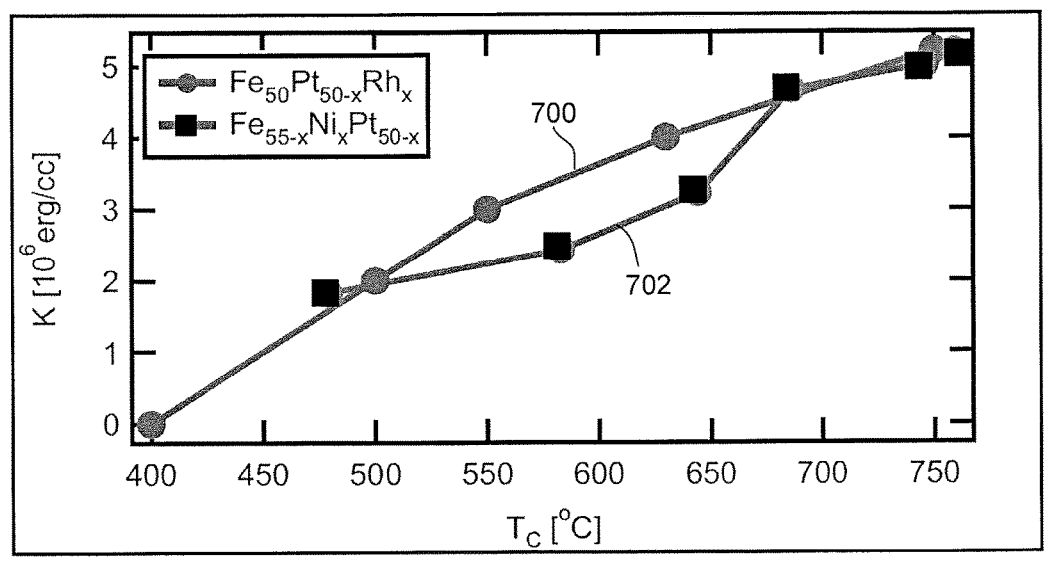
FIG. 7 graphically illustrates K v. Tc characteristics of some embodiments.

FIG. 5 provides performance curves 500, 502 for the above respective formulations to show the effects upon magneto-crystalline anisotropy K. FIG. 6 provides performance curves 600, 602 for the above respective formulations to show the effects upon Curie temperature Tc. FIG. 7 plots Curie temperature Tc versus anisotropy K for the above respective formulations via curves 700, 702.

From the foregoing graphs it can be seen that the substitutionary doping of a suitable material such as Rh in the ranges disclosed can provide a number of benefits and provide media particularly suitable for low power HAMR (and other thermally assisted) media systems. The performance of the FePtRh media showed to be improved in several respects as compared to the FeNiPt media including magnetic saturation (Ms), FIG. 4; anisotropy (K), FIG. 5; Curie temperature (Tc), FIG. 6; and Curie temperature versus anisotropy, FIG. 7.

A number of alternatives are contemplated. For example, multi-layer recording structures with two or more recording layers such as in FIG. 3 can be provided with different layers having different respective levels of doping. In one example, the recording layers are provided with successively higher values for X (at %) so that recording layer 1 has a lower value of X (e.g., closer to 0 at %), recording layer 2 has an intermediate value of X greater than that for recording layer 1, and recording layer 3 has a highest value of X (e.g., closer to 20) greater than that for recording layer 2.

In another example, these values may be reversed so that recording layer 1 has a highest value of X, recording layer 2 has an intermediate value of X less than that of recording layer 1, and recording layer 3 has a lowest value of X less than that of recording layer 2.

The different layers may be provided with different formulations; for example, at least one layer may be formulated as in FIGS. 4-7 and another may be formulated as an IrPt layer with substitutionary Rh (or other) doping. In another example, each of the recording layers 1-3 may be supplied with a different one of Rh, Ru, Os or Ir as a substitutionary element for Pt. The value of X for each of these layers may be the same, or may be different from that of the other layers. In some cases, the value of X for a first layer may be at least twice the value of X for a second layer.

In another example, a multi-layer recording structure is provided with a first recording layer having a formulation as set forth above and a second recording layer having a different formulation. For example, the multi-layer recording structure may have the first recording layer with a formulation of $Fe_{50}Pt_{50-x}Rh_x$ with X from about 0 at % to about 20 at %. Curve 402 is for FeNiPt media formulated as $Fe_{55-x}Ni_xPt_{50-x}$, with X from about 0 at % to about 55 at %. These and other considerations will readily occur to the skilled artisan in view of the present disclosure and may be derived for a particular application.

A generalized formulation for the thermally assisted recording layer can be expressed as $Fe_Y Pt_{Y-X} T_X$ where the placeholder symbol T is a selected one of the transition metals Rh, Ru, Os or Ir so that the transition metal substitutes for a portion of the Pt content. Suitable values for Y are in the range of from about 20 at % to about 80 at %, and suitable values for X are in the range of from about 0 at % to about 20 at %. As used herein, reference to a percentage of about 0 at % requires some presence of the associated element.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising a thermally assisted data recording medium with a multi-layer recording structure comprising first, second, and third recording layers each formed of a common composition of iron (Fe), platinum (Pt) and a transition metal T selected from a group consisting of Ruthenium (Ru), Osmium (Os) and Iridium (Ir) to substitute for a portion of the Pt content as $Fe_Y Pt_{Y-X} T_X$ with Y in a range from about 20 at % to no more than 50 at % and X in a range from greater than 0 at % to about 20 at %, the first recording layer having a greater value for X than the second and third recording layers, the second recording layer having a greater value for X than the third recording layer.

2. The apparatus of claim 1, wherein each recording layer is formed of $Fe_{50}Pt_{50-X}Os_X$.

3. The apparatus of claim 2, wherein X is greater than 0 at % to about 15 at %.

4. The apparatus of claim 2, wherein X is from about 1 at % to about 20 at %.

5. The apparatus of claim 2, wherein X is from about 1 at % to about 5 at %.

6. The apparatus of claim 1, wherein the first recording layer is positioned between a carbon overcoat layer closer to an air bearing surface and the second recording layer.

7. The apparatus of claim 1, wherein the first, second, and third recording layers are each formed of $Fe_{50}Pt_{50-X}Os_X$ where the first recording layer uses a first value of X in a range from 15 at % to about 20 at %, the second recording layer uses a different, second value of X in a range from greater than 0 at % to about 20 at %, and the third recording layer uses a different third value of X in a range of greater than 0 at % to about 20 at %.

8. The apparatus of claim 7, wherein the first value of X is at least about twice the second value of X.

9. The apparatus of claim 1, wherein the second recording layer is disposed between and contacting the first and third recording layers.

10. A data recording medium comprising:
a substrate; and
a thermally assisted data recording structure separated from the substrate by a soft magnetic underlayer, the thermally assisted data recording structure comprising first, second, and third recording layers each formed of $Fe_{50}Pt_{50-X}Os_X$, where X is different for the first, second, and third recording layers and in a range from greater than 0 at % to about 20 at %.

11. The data recording medium of claim 10, wherein X is greater than 0 at % to about 5 at %.

12. The data recording medium of claim 10, wherein X is in the range from about 5 at % to about 20 at %.

13. The data recording medium of claim 10, wherein the second recording layer is disposed between and contacting the first recording layer and third recording layer.

14. The data recording medium of claim 10, wherein the second recording layer has a greater value for X than the first recording layer and a lesser value for X than the third recording layer.

15. The data recording medium of claim 14, wherein the first recording layer has a value for X of 20 at %.

16. The data recording medium of claim 14, characterized as a heat assisted magnetic recording (HAMR) medium.

17. The data recording medium of claim 10, wherein the value for X successively increases from the first recording layer through the second recording layer to the third recording layer.

18. A data recording medium comprising a substrate and a multi-layer recording structure positioned atop the substrate, the multi-layer recording structure comprising first, second, and third recording layers, each recording layer having a different material composition of $Fe_Y Pt_{Y-X} T_X$ with T selected from a group consisting of Rh, Ru, Os and Ir, Y is in a range from about 20 at % to no greater than 50 at % and X is in a range from greater than 0 at % to about 20 at %, the first, second, and third recording layers having successively greater values for X.

19. The data recording medium of claim 18, wherein the material composition of the second recording layer is $Fe_{50}Pt_{50-X}Ir_X$, where X is in the range from greater than 0 at % to about 20 at %.

20. The data recording medium of claim 18, wherein the material composition of the first recording layer is $Fe_{50}Pt_{50-X}Os_X$, where X is in a range from greater than 0 at % to 5 at % and the material composition of the second recording layer is $Fe_{50}Pt_{50-X}Rh_X$, where X of the second recording layer is in a range from 6 at % to 20 at %.

* * * * *